(12) United States Patent
Barthelme et al.

(10) Patent No.: US 11,898,607 B2
(45) Date of Patent: Feb. 13, 2024

(54) NON-LOCATING BEARING ASSEMBLY (71) Applicant: AKTIEBOLAGET SKF, Gothenburg (SE)

(72) Inventors: Juergen Barthelme, Grettstadt (DE); Helmut Hauck, Euerbach (DE); Sebastian Kraus, Schwanfeld (DE); Andreas Herbert Kraus, Bergrheinfeld (DE); Stefanie Seufert, Rothhausen (DE); Alexander Dilje, Schweinfurt (DE); Hans-Juergen Friedrich, Königsberg-Römershofen (DE); Berthold Beyfuss, Wasserlosen-Kaisten (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/824,937

(22) Filed: May 26, 2022

(65) Prior Publication Data
US 2022/0389956 A1    Dec. 8, 2022

(30) Foreign Application Priority Data

Jun. 8, 2021   (DE) .......................... 102021205789.6

(51) Int. Cl.
*F16C 35/077*   (2006.01)
*F16C 25/08*    (2006.01)
*F16C 23/08*    (2006.01)

(52) U.S. Cl.
CPC ............ *F16C 35/077* (2013.01); *F16C 23/08* (2013.01); *F16C 25/083* (2013.01)

(58) Field of Classification Search
CPC ........ F16C 23/08; F16C 25/08; F16C 25/083; F16C 27/04; F16C 35/077
See application file for complete search history.

(56) References Cited

U.S. PATENT DOCUMENTS

| 5,899,574 | A  | * | 5/1999 | Chujo | F16C 25/083 |
| | | | | | 384/906 |
| 8,303,188 | B2 | * | 11/2012 | Otsuka | F16C 35/067 |
| | | | | | 384/537 |
| 8,388,232 | B2 | * | 3/2013 | Lida | F16C 27/066 |
| | | | | | 277/641 |
| 9,702,403 | B2 | * | 7/2017 | Beck | F16C 27/04 |
| 10,641,322 | B2 | * | 5/2020 | Isaji | H02K 5/1732 |
| 10,910,911 | B2 | * | 2/2021 | Shirai | H02K 7/116 |
| 2009/0080823 | A1 | * | 3/2009 | Bauch | F16C 27/04 |
| | | | | | 384/518 |
| 2022/0389955 | A1 | * | 12/2022 | Kraus | F16C 25/083 |
| 2022/0389957 | A1 | * | 12/2022 | Barthelme | F16C 27/04 |

* cited by examiner

*Primary Examiner* — James Pilkington
(74) *Attorney, Agent, or Firm* — J-TEK LAW PLLC; Scott T. Wakeman; Mark A. Ussai (57) ABSTRACT A non-locating bearing assembly includes a bearing unit configured to support a rotatable component relative to a stationary component, the bearing unit including a first stationary bearing ring and a second rotatable bearing ring. The rotatable bearing ring is fixedly connectable to the rotatable component, and a bearing carrier is attached to the stationary bearing ring in a rotationally fixed but axially displaceable manner by a combination of a friction fit and an interference fit. The bearing carrier is configured to be fixedly connected to the stationary component.

13 Claims, 7 Drawing Sheets

NON-LOCATING BEARING ASSEMBLY

CROSS-REFERENCE

This application claims priority to German patent application no. 10 2021 205 789.6 filed on Jun. 8, 2021, the contents of which are fully incorporated herein by reference.

TECHNOLOGICAL FIELD

The present disclosure is directed to a non-locating bearing assembly that includes a bearing carrier for supporting a bearing ring in an axially displaceable and substantially rotationally fixed manner.

BACKGROUND

Non-locating bearing assemblies are always used when a stationary bearing ring of a bearing unit is to be movably supported axially relative to a component receiving the bearing unit. Such an axial displacing is necessary in particular when different coefficients of thermal expansion prevail between the stationary component and the bearing. These different coefficients of thermal expansion lead to a variable fit between the stationary bearing ring and the stationary component, which in turn can lead to damage to the bearing or the stationary component when they are not compensated for.

The reason for this is that this variable fit causes the bearing ring that is supposed to be stationary to co-rotate with the rotating bearing ring. This creeping or co-rotation of the stationary bearing ring then leads to damage to the bearing, and must therefore be prevented.

It is also problematic that the variable fit can also lead to a blockage of the axial displaceability, which negatively influences or damages not only the bearing, but the entire component to which the non-locating bearing assembly is attached.

In order to in particular counter the different thermal expansions, in the prior art it has been proposed to provide the stationary component with a so-called inlay that has the same thermal expansion properties as the stationary bearing ring. Thus it has been proposed in particular to introduce a steel ring between the bearing ring and the stationary component, which steel ring, however, can be introduced into the stationary component only at high expense, such as, for example, by welding, soldering, adhering, screwing, or in-situ injecting. In addition, this ring must subsequently be machined and matched to all individual elements so that the tolerances of all elements can be set. However, this requires a very high installation expense, which in turn leads to high costs.

SUMMARY

An aspect of the present disclosure is therefore to provide a non-locating bearing assembly that provides a rotational securing, an axial clearance reduction, and a temperature expansion compensation, and that is simple to install.

In the following a non-locating bearing assembly including a bearing unit is disclosed that is configured to support a rotatable component relative to a stationary component and that includes a first stationary bearing ring and a second rotatable bearing ring. Here the rotatable bearing ring is fixedly connectable to the rotatable component. Such a fixed connectability can be induced by snap rings or a press fit.

In order to make possible a simplest-possible installation of the non-locating bearing assembly on the stationary component, the non-locating bearing assembly furthermore includes a bearing carrier that is fixedly connectable to the stationary component. In the bearing carrier, the stationary bearing ring is in turn attached such that it essentially does not rotate but is axially displaceable. It is advantageous here in particular when the non-locating bearing assembly is provided as a preinstalled unit made of a bearing carrier and a bearing unit. The entire non-locating bearing assembly can thereby easily be attached to the stationary component without the tolerances of the individual components having to be set separately and laboriously during installation.

This is advantageous in particular when not only a bearing unit, but further elements such as, for example, a spring element, are disposed in the non-locating bearing assembly. Such a spring element is, for example, provided to interact with the bearing carrier and the stationary bearing ring so that the axially displaceable stationary bearing ring is axially preloaded in the bearing carrier. Of course, however, it is also possible to provide a bearing carrier including a non-locating bearing assembly disposed therein, wherein no preinstalled unit is depicted, but rather wherein the bearing carrier is merely configured to receive the spring element, and the spring element preloads the stationary bearing ring only in the installed assembly configuration.

According to a further advantageous exemplary embodiment, the bearing carrier furthermore includes a stop element that interacts with the spring element or the bearing ring in order to limit the axial mobility of the bearing ring. This is advantageous in particular for a preinstalled unit made of a bearing carrier and bearing ring, since the stop element simultaneously prevents the bearing unit from falling out. In addition, using the defined stop element, the preload of the non-locating bearing assembly can already be set overall during manufacturing so that a laborious adapting of the tolerances and preloads during installation can be omitted.

The bearing carrier and the bearing unit are preferably manufactured from the same material, but it is also possible that they are manufactured from different materials, wherein, however, it is preferable to use materials that have similar coefficients of thermal expansion. The same thermal expansion conditions thereby prevail between bearing carrier and stationary bearing ring, so that fitting problems between the bearing carrier and the stationary bearing ring are prevented due to identical thermal expansions.

The bearing carrier itself can be configured substantially pot-shaped and include a flange configured as a pot rim that is provided with at least one attachment element by which the bearing carrier is attachable to the stationary component. A particularly simple and fast installation of the non-locating bearing assembly, and in particular of the bearing carrier on the stationary component, is thereby possible. Depending on the design of the stationary component, of course the pot base can also be configured as a flange and be connectable to the stationary component.

In order to make possible a rotationally fixed but axially displaceable attaching of the stationary bearing ring into the bearing carrier, according to a further preferred exemplary embodiment the stationary bearing ring is attached to the bearing carrier in a rotationally fixed manner by a combination of friction-fit and interference-fit attaching. The combination of friction-fit and interference-fit attaching makes possible on the one hand an easy assembly, since friction-fit attachments are easily producible. In addition, already-existing elements can also be used on the bearing ring or bearing carrier in order to attach the friction-fit elements thereto. On the other hand, the interference fit makes it possible that even with rotational loads the stationary bearing ring is disposed in the stationary bearing carrier such that they are rotationally fixed.

Here it is preferred in particular to provide a connecting element that interacts in a friction-fit manner with at least one abutment surface, and the connecting element includes at least one first rotation-securing element that interacts in an interference-fit manner with a second rotation-securing element on a counterelement. Here, for example, the at least one abutment surface can be formed on the bearing ring, and the at least one second rotation-securing element can be formed on the bearing carrier, which then functions as counterelement. Alternatively, of course, the at least one abutment surface can be formed on the bearing carrier, and the at least one second rotation-securing element can be formed on the bearing ring itself.

Since an additional connecting element is provided that interacts in a friction-fit manner with the bearing ring or the bearing carrier, and on which the first rotation-securing element is formed, the interference fit between bearing ring and bearing carrier can be formed indirectly, wherein, however, a simple assembly is possible. Due to the additional connecting element, the interference-fit connecting possibilities between bearing ring and bearing carrier also increase so that the widest variety of application-specific requirements can be addressed in a problem-free manner. Furthermore, the friction-fit connecting of the connecting element to an abutment surface makes possible a very simple and rapid attaching possibility of the connecting element.

According to a further advantageous exemplary embodiment, the stationary bearing ring and/or the bearing carrier includes at least one circumferential groove that provides the at least one abutment surface, and in which the connecting element is disposed in a friction-fit manner. Circumferential grooves are very simple to introduce into the corresponding component during manufacturing or are already present on the corresponding components as standard, so that such a design provides a particularly cost-effective and easy-to-manufacture possibility to attach the stationary bearing ring in the stationary component such that they rotate together.

Furthermore, the at least one rotation-securing element includes at least one radially outwardly or radially inwardly projecting projection, and the at least one second rotation-securing element is a receptacle configured to receive the projection. Alternatively the at least one second rotation-securing element is at least one radially outwardly or radially inwardly projecting projection, while the at least one first rotation-securing element is a receptacle configured to receive the projection. Here the additional rotation-securing elements ensure that with temporally long use or with unfavorable environmental conditions, such as, for example, an oil environment that would reduce a friction fit, a rotation-fixed connection is maintained.

Such circumferential grooves are easily introducible into the bearing carrier or bearing ring during the final processing thereof or are already present as elements in standard components. In such a groove, a ring as connecting element, on which the corresponding rotation-securing elements are formed, can then easily be inserted or snapped in.

For example, a garter or worm spring having a plurality of coils, which is frictionally received in the peripheral groove and which exerts a radial spring force on a contact surface on the stationary component or the bearing ring, can be used as the connecting element, with the coils of the garter spring being designed to accommodate unevenness engage in the groove and/or on the contact surface, so that a positive-locking connection is formed in the circumferential direction. Processing marks, which ensure a certain irregularity or roughness, arise during the producing of grooves or even during the manufacture of the stationary component or bearing ring. These irregularities can interact with the windings of the garter spring such that these windings hook onto the irregularities and thereby provide an interference fit that provides an additional rotation-securing. In addition, due to the radial contact force of the garter spring and a corresponding force application in the circumferential direction, an embedding of the windings of the garter spring into the groove or the abutment surface can be effected so that an interference fit is also provided by the embedding of the garter spring itself.

As mentioned above, the irregularities can arise automatically during the manufacturing process of the bearing or of the stationary component, but it is also possible to actively introduce such irregularities in order to provide a corresponding gripping possibility for the windings of the garter spring.

It is also possible to inject the connecting element into the groove, in particular when the connecting element is manufactured from a plastic material. In addition to the injecting into a groove, it is of course also possible to overmold the connecting element onto the abutment surface as such and optionally also to fully enclose or cover the abutment surface.

According to a further preferred exemplary embodiment, the connecting element is annular, and the at least one rotation-securing element is a radially outwardly or radially inwardly projecting projection that is received in at least one receptacle such that an interference-fit connection is provided. Here the receptacle is formed on the corresponding counterelement. That is, when the connecting element is attached to the bearing ring in a friction-fit manner, then the stationary component is the counterelement that includes the receptacle. The receptacle can advantageously be an axially extending groove so that the axial mobility remains ensured.

It is particularly advantageous when the projection and the receptacle are formed complementarily. Small movements in the rotational direction between stationary bearing ring and bearing carrier can thereby also be prevented.

According to a further advantageous exemplary embodiment, the connecting element is a spring element which is resilient in the radial direction, in particular a snap ring, wherein the circumferential ends of the snap ring are bent in the radial direction in order to form the first rotation-securing element. In order to enhance the interference fit and the friction fit, the connecting element can also spring radially outward or radially inward, wherein the spring element is preloaded toward the counterelement receiving the projection. In particular, this can prevent the projection from being pressed out from the receptacle. Such an embodiment forms a particularly simple and rapid design of a rotation-securing connecting element. Here the spring element or the snap ring can be manufactured from metal or from plastic.

Alternatively or additionally, the connecting element can include radially resilient tabs that are configured to snap into the groove and/or to spread into the groove so that a friction fit acting in the circumferential direction is formed between the radially resilient tabs and the groove. In addition to the increased friction fit, such tabs can of course also embed into the material of the groove or interact with irregularities in the groove so that the friction force is increased by an interference-fit component. A manufacturing from metal, just like from plastic, is also possible here. With a manufacturing from metal, by an embedding of the tabs into the groove or the groove walls it can additionally be achieved that the friction fit is increased by interference-fit elements.

In addition, the friction fit of the connecting element can also be increased via material connecting features, in particular via adhesion.

The groove itself can be formed at a plurality of locations on the bearing ring, and a plurality of grooves of identical or different shape and arrangement can also be present. Thus, for example, at least one of the at least one groove can be formed in a radial surface of the bearing ring and have a U-shape in cross-section. Alternatively or additionally, the groove can also be formed at a transition from a radial surface of the bearing ring to an end surface of the bearing ring and be at least partially open toward the end surface. In cross-section the groove then has a L-shape or slight hook shape. Furthermore, the at least one of the at least one groove can be a seal-element receiving groove already provided on the bearing ring, which seal-element receiving groove is usually introduced as standard for receiving a seal element in the bearing ring. Here such a seal-element receiving groove is usually facing the bearing interior so that a combination with the above-described exemplary embodiment with tabs snapping into the groove is particularly preferred in this case.

Not only one groove can be present here, but also a plurality of identically designed or different grooves can also be present in combination.

According to a further preferred exemplary embodiment, the projection is formed complementary to the receptacle.

It is advantageous here in particular when the receptacle is formed as an axially extending continuous opening in the bearing carrier. Here the continuous opening can extend solely in the pot wall and be dimensioned such that the projection is formed to be immovable in the circumferential direction but movable in the axial direction between two stops. Such openings or also slots are simple to produce in the bearing carrier.

Alternatively the opening can also be configured as a one-side axially open slit that extends in a pot-shaped bearing carrier from the pot base along the pot wall up to the pot rim, wherein preferably a plurality of openings can be provided so that the bearing carrier includes discreet zigzag-shaped elements forming the pot wall and the pot base, which zig-zag shaped elements are carried by an annular flange. Such a design provides the same preferred advantages as a continuous bearing carrier but is significantly lighter and thus advantageous in particular in applications in which a weight reduction is to be achieved. According to a further advantageous exemplary embodiment, large-surface projections of a connecting element are disposed in these slit-shaped openings; the connecting element is snapped on, pressed, on or adhered onto the bearing ring.

According to a further advantageous exemplary embodiment, the bearing carrier, bearing ring, and connecting element are manufactured from materials that have similar coefficients of thermal expansion. However, they can also be manufactured overall from the same material.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

The appended Figures show preferred exemplary embodiments of a non-locating bearing assembly 1 including a bearing carrier 2 in which a bearing unit 4 and a spring element 6 are disposed. The exemplary embodiments depicted show a non-locating bearing assembly 1 that can be used, for example, for supporting a shaft in a housing, wherein the housing is stationary and the shaft is configured to rotate. Of course, the non-locating bearing assembly 1 is also usable in other applications, for example, a stationary pin and a rotating housing.

It is advantageous here in particular when the bearing carrier 2 and the bearing unit 4 are manufactured from the same material or at least from materials having identical or similar thermal expansion coefficients. Fit changes in operation can thereby be prevented.

In the depicted exemplary embodiments, the bearing carrier 2 is configured pot-shaped and includes a pot rim configured as flange 20, a pot wall 22, and a pot base 24, wherein the pot base 24 includes a large recess 26 in order to attach the non-locating bearing assembly 1 to the movable component (not depicted). Furthermore, the bearing carrier 2 includes attachment options 28 that are preferably disposed equally spaced along the flange 22. The attachment elements 28 can be configured as through-holes that are suitable for the receiving of screws. Of course, other attachment elements are also possible.

The bearing unit 4 comprises a bearing outer ring 40 that is configured in the depicted exemplary embodiment as a stationary bearing ring and a bearing inner ring 42 that is rotatable here, which are disposed spaced with respect to each other and receive rolling elements 44 between them that are guided and held uniformly spaced by a cage 46. As mentioned above, the exemplary embodiments are suited in particular for a shaft bearing assembly in a housing wherein the outer ring is disposed rotationally fixed but axially displaceable. However, it is equally possible to form the bearing inner ring axially displaceable. Such a design is advantageous in particular with rotating housings, such as, for example, a hollow shaft.

In the exemplary embodiments depicted the bearing unit is furthermore configured as a ball bearing, but all other types of rolling-element bearings and plain bearings are also possible.

Furthermore, it can be seen from the Figures that in addition to the bearing unit 4 a spring element 6 is also disposed in the bearing carrier 2. This spring element 6 ensures that the bearing outer ring 40 is preloaded in the bearing carrier 2. Here one side of the spring element 6 is supported on the pot base 24 of the bearing carrier 2 and the other side is supported on an end side 50 of the bearing outer ring 40.

In order to in particular provide a preinstalled non-locating bearing assembly 1, the bearing carrier 2 can furthermore be equipped on the flange side with a stop 32 that contacts and supports the bearing outer ring 40 on its other end side 52. It is thereby also possible to arrange the bearing unit overall in an already preloaded rest position in the bearing carrier 2. At the same time the entire non-locating bearing assembly 1 can be attached to a stationary component without having to account for tolerances so that a particularly simple installation is possible. A wave spring made of a flat wire is preferably used as the spring element 6. However, every other type of spring element 6 is also equally possible, such as, for example, a plate spring.

As mentioned above, in the exemplary embodiments depicted the non-locating bearing assembly 1 is a non-locating bearing assembly in which the outer ring 40 is rotationally fixed but axially displaceable while the bearing inner ring 42 is fixed to a shaft not depicted here. In contrast, the bearing carrier 2 that receives the bearing unit 4 is fixed and also not axially displaceable with respect to a housing (not depicted) in which the non-depicted shaft is supported.

Figure 1:
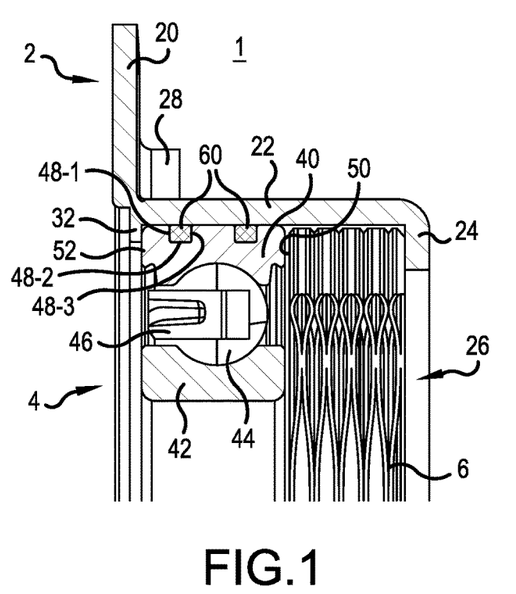
FIG. 1 is a sectional side elevational view of a non-locating bearing assembly including a bearing unit, a bearing carrier and a connecting element according to a first embodiment of the present disclosure.

FIGS. 1 to 4 illustrate two further preferred exemplary embodiments for a non-locating bearing assembly 1. FIG. 1 shows a sectional view through the non-locating bearing assembly 1 in which the outer ring 40 of the bearing unit 4 is in turn mounted in the bearing carrier 2 such that it is axially movable but rotationally immovable. In order to prevent a co-rotation of the bearing ring 40, a connecting element 60 is introduced into the groove 48, which connecting element 60 interacts on the one hand in a friction-fit manner with the groove walls 48-1 to 48-3, and in addition includes a rotation-securing element 62 in the form of a projection 62 (see in particular FIGS. 2 and 4), which engages into the bearing carrier 2 in an opening 30 in the form of a groove (see FIG. 3). The groove 30 in the bearing carrier 2 is configured as an axially extending longitudinal groove so that an axial movability of the bearing ring 40 is nonetheless possible.

Figure 2:
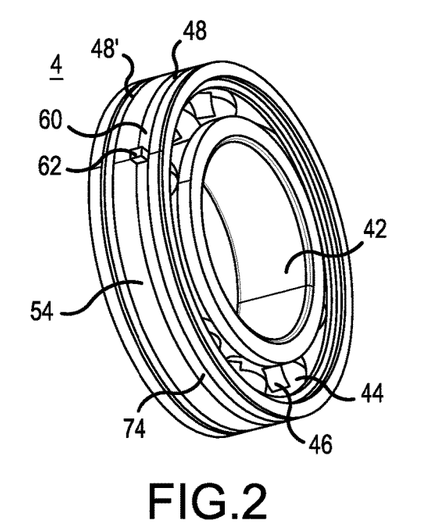
FIG. 2 is a perspective view of the bearing unit and connecting element of FIG. 1 removed from the bearing carrier.
Figure 3:
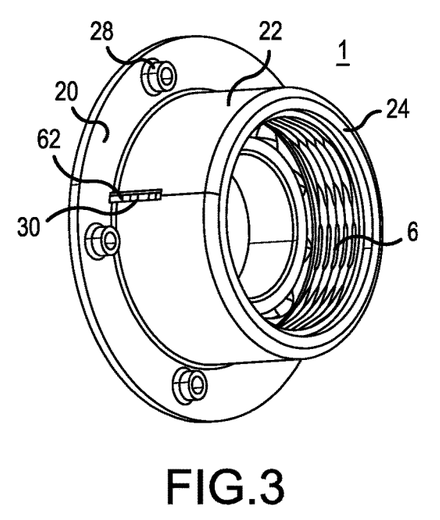
FIG. 3 is a perspective view of the bearing carrier of FIG. 1.
Figure 4:
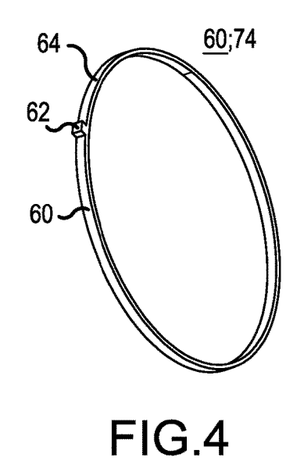
FIG. 4 is a perspective view of the connecting element of FIGS. 1 and 2.

As depicted in particular in FIGS. 2 and 4, the connecting element 60 including the projection 62 can be configured as a one-piece plastic ring 74 that is injected into the groove 48 of the outer ring. Due to the injecting, the friction fit between the connecting element 60 in the form of a plastic ring 74 and the side walls of the groove 48 can also be increased. Of course, however, other friction-fit attaching possibilities of the plastic ring 72 in the groove 48 are also possible.

Figure 5:
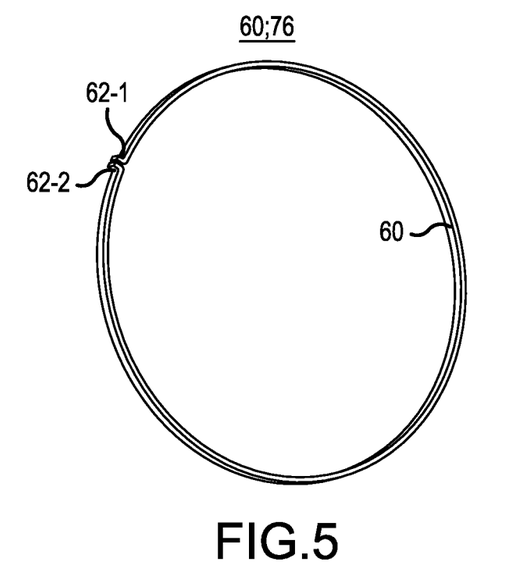
FIG. 5 is a perspective view of another embodiment of a connecting element.
Figure 6:
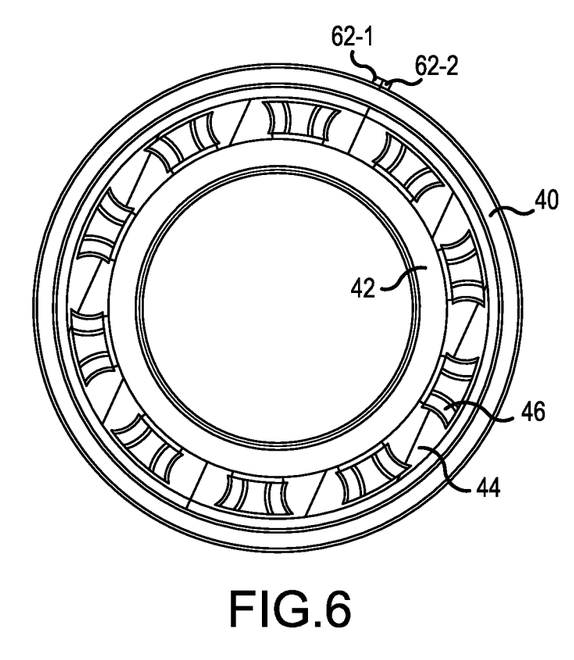
FIG. 6 is a side elevational view of the connecting element of FIG. 5 attached to a bearing unit.

Thus it is also possible, for example, as shown in FIGS. 5 and 6, to configure the connecting element 60 as snap ring 76 that is snapped-in into the groove 48. Also in this exemplary embodiment a projection 62 is in turned formed that is configured to engage in the groove 30 on the bearing carrier 2, and thus provides a rotation-securing.

The snap ring 76 can in particular be manufactured from a metallic material and provide a certain spring action radially outward so that a securing of the projection 62 in the groove 48 is ensured. Alternatively the snap ring 76 can also be configured such that it shows a spring action radially inward so that the material of the snap ring abuts close to the groove base and exerts a radial force inwardly on it so that the friction fit between snap ring 76 and groove 48 is increased.

As can furthermore be seen from FIGS. 5 and 6, it is preferred in particular when the opening of the snap ring 74 is formed in the region of the projection 62, wherein, for example, this can be achieved via outwardly bent metal elements 62-1, 62-2. In this case the projection 62 is then configured two-part.

It can also be seen from the view from FIG. 2 that the outer ring 40 may have not only one groove 48, but also a second groove 48' in which a connecting element (not depicted here) can similarly be received. Here all the connecting elements 60 described above and in the following, or also other connecting elements are possible individually or in combination as connecting element 60. Thus for example, a garter spring can also be received in the groove 48'.

A garter spring applies a radially outwardly acting spring force F on the bearing carrier 2 so that a friction fit is achieved between garter spring and bearing-carrier inner wall. In addition, the garter spring abuts against the side walls of the groove 48' so that a friction fit is also achieved here between the garter spring and the groove.

In addition, the garter spring includes a plurality of windings and is preferably manufactured from a metallic material. These windings ensure that the garter spring embeds in the abutment surface formed by the inner side of the bearing carrier 2 or interacts with irregularities that arise during the manufacture of the bearing carrier 2 so that in addition to a friction force, an interference-fit component also prevents rotation of the outer ring 40 relative to the bearing carrier 2. The windings similarly also grip into the side walls of the groove 48 so that the friction fit is also strengthened here by interference-fit components, and the bearing ring 40 is prevented from rotating relative to the bearing carrier.

The grooves 48 or 48' are usually already present in bearing rings 40 for non-locating bearings so that preexisting non-locating bearing assemblies can also be equipped with the improved connecting element 60.

The groove 48 itself can be configured not only as a U-shaped groove 48 including side walls 48-1, 48-2, 48-3, which is introduced into a radial surface 54 (see FIG. 2) of the bearing outer ring 40, but rather the groove 48 can also be located on the edge of the radial surface 48 and be open to an end surface 50; 52 of the bearing outer ring 40. Furthermore, the groove 48 can include a slight undercut (not depicted) so that the connecting element 60 can be received particularly well in the groove 48 in a friction-fit and interference-fit manner.

On the connecting element 60, of course not only one projection 62, but rather a plurality of projections 62 can be provided that are distributed circumferentially about the ring 64.

The above-discussed connecting element 60 can be manufactured from plastic and from metal.

Furthermore, the connecting element 60 can also have a certain ovality so that the bearing ring is also prevented from rotating by the fact that due to the ovality, further rotation of the bearing ring 40 relative to the connecting element 60 or the bearing carrier 2 is prevented.

FIGS. 7 to 10 show a further preferred exemplary embodiment of a non-locating bearing assembly 1 that is disposed in the bearing carrier 2 such that they are rotationally fixed but such that the non-locating bearing assembly is axially displaceable in the bearing carrier 2, wherein, however, in addition to attaching the bearing ring 40 in the bearing carrier 2 such that they are rotationally fixed but the bearing ring 40 is axial displaceable in the bearing carrier 2, the connecting element 60 also has the function of limiting the axial movability of the bearing 4 and thus providing a preassembled non-locating bearing assembly 1. For this purpose the connecting element 60 (see in particular FIG. 9) is configured as a snap ring that includes tabs 66 that are carried by a ring element 64. The tabs 66 of the connecting element snap into the groove 48 (see FIG. 7) on the bearing ring 40, wherein in this exemplary embodiment the groove 48 is configured as a groove open to the end side 52. Furthermore, structures 54 are provided in the groove 48, into which structures the tabs 66 can engage. The tabs 66 are held by friction fit in the groove 48 or on the structures 54, wherein in particular the friction fit can be increased by material connecting means, such as, for example, adhesive. If the connecting element is also manufactured from metal, the tabs 66 can embed into the structure 54 of the groove 48 so that the friction fit can also be increased by interference-fit connecting components.

Figure 8:
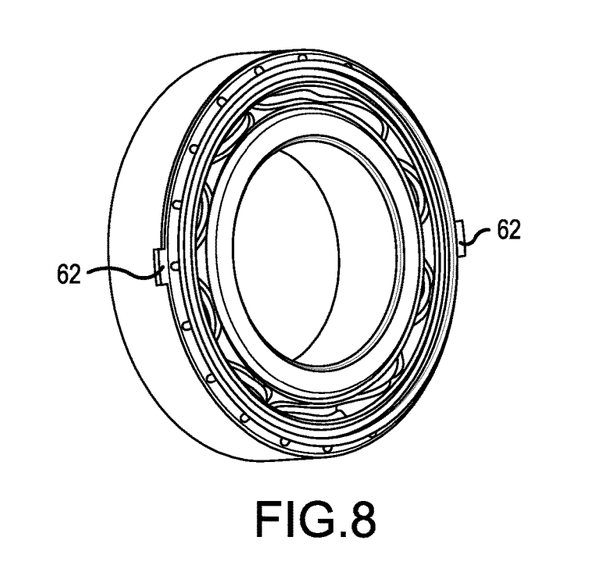
FIG. 8 is a perspective view of the bearing unit and connecting element of FIG. 7 removed from the bearing carrier.
Figure 9:
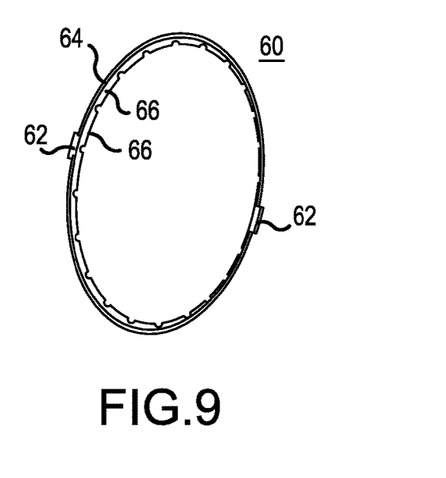
FIG. 9 is a perspective view of the bearing carrier of FIG. 7.
Figure 10:
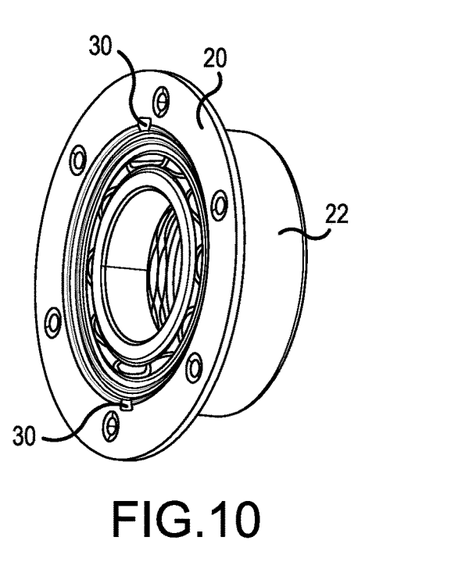
FIG. 10 is a perspective view of the connecting element of FIG. 7.

In order to furthermore secure the bearing ring 40 against rotation in the bearing carrier 2, the connecting element 60 furthermore includes projections 62 that, as can also be seen from FIG. 8, protrude over the outer surface of the ring 40 and are configured to be received in an opening 30 in the bearing carrier 2 (see FIG. 10). Here the opening 30 is configured as an elongated opening so that an axial movability of the bearing ring 40 is permitted. However, the projection 62 and the opening 30 simultaneously match in the circumferential direction so that no or only a very slight clearance is provided in the circumferential direction.

In order to also simultaneously provide the connecting element 60 with the function of a stop element 32, it is provided that the opening 30 is furthermore dimensioned such that the axial displaceability of the connecting element 60 in the opening 30 is axially limited both toward the bearing carrier base 24 and toward the flange 20. This can be achieved, for example, by the projection 62 interacting with the flange 20, wherein in particular the projection 62 has a larger diameter radially than the opening 30.

Alternatively, however, a stop element 32 can also be shaped here from the flange 20, as depicted in FIG. 1.

Instead of an additional groove 48 in the bearing outer ring 6, an already existing groove, such as, for example, a groove 49 for receiving a seal element for the attaching of the connecting element 60 can also be used.

FIGS. 11 to 21 show further preferred exemplary embodiments of a non-locating bearing assembly 1, wherein the groove 48 on the bearing ring 40 need not be specially designed as is the case in the previously discussed exemplary embodiments, but rather wherein an already existing seal groove 49 is used on the bearing ring 40 in order to receive the connecting element 60.

Figure 11:
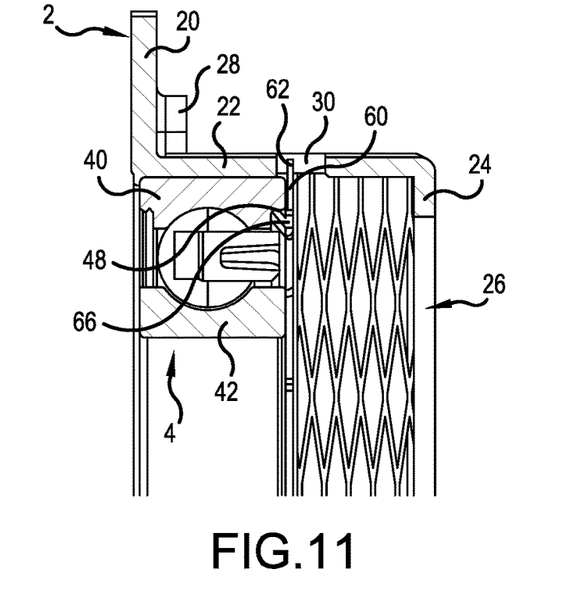
FIG. 11 is a sectional side elevational view of a non-locating bearing assembly including a bearing unit, a bearing carrier and a connecting element according to a third of the present disclosure.
Figure 12:
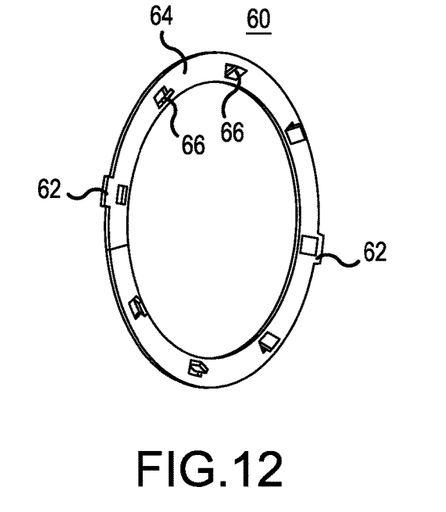
FIG. 12 is a perspective view of the bearing unit and connecting element of FIG. 11 removed from the bearing carrier.
Figure 13:
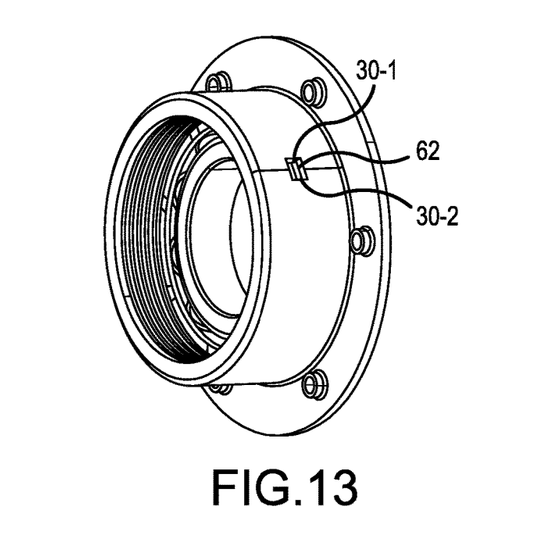
FIG. 13 is a perspective view of the bearing carrier of FIG. 11.
Figure 14:
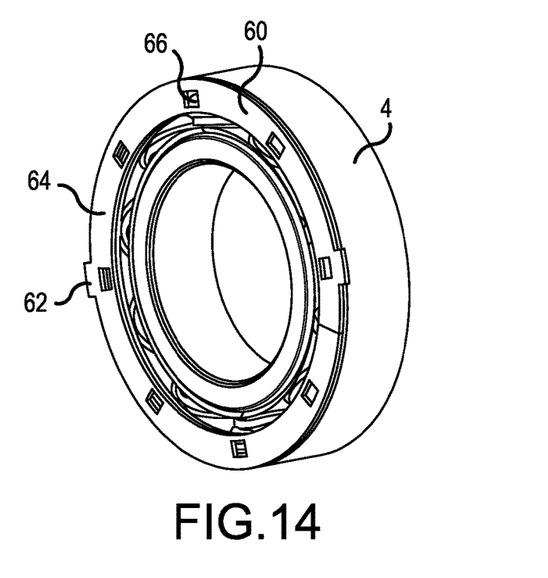
FIG. 14 is a perspective view of the connecting element of FIG. 11.

In the first exemplary embodiment shown in FIGS. 11 to 14, the connecting element 60, as can be seen in particular from FIG. 12, is configured as an annular flat element 60 that includes a ring 64 from which tabs 66 are bent out that engage into the groove 49 (see FIG. 11). Furthermore, the connecting element 60 includes projections 62, 63 protruding radially over the ring element 64, which projections 62, 63 are received in corresponding openings 30 of the bearing carrier 2. It can also be seen well in FIG. 11 that with an axial load of the bearing ring 40, the projection 62 can move axially in the opening 30. In contrast, in the circumferential direction, as can be seen from FIG. 13, the movement is limited by the side wall 30-1, 30-2 of the opening 30, wherein the projection 62 abuts here. In this exemplary embodiment, the connecting element 60 is preferably manufactured from a metallic material.

At the same time it can be seen from FIG. 11 that the bearing element, as already described above, is axially preloaded by the spring element 6 and is limited in its axial movability on the side facing away from the spring element by a stop 32.

Figure 15:
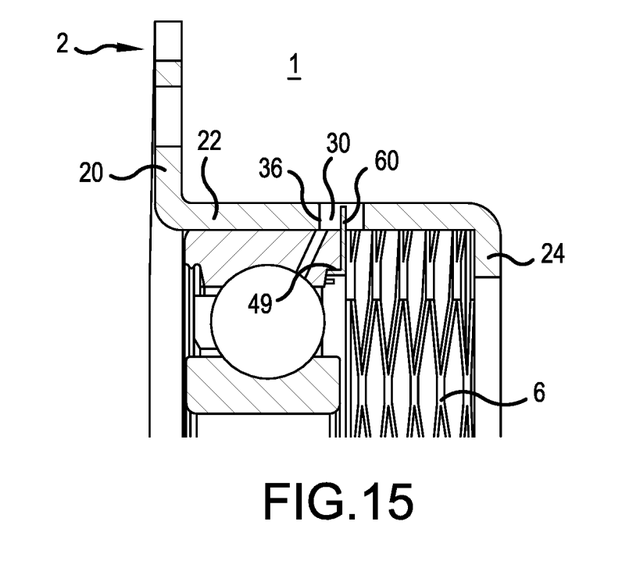
FIG. 15 is a sectional side elevational view of a non-locating bearing assembly including a bearing unit, a bearing carrier and a connecting element according to a fourth of the present disclosure.
Figure 15A:
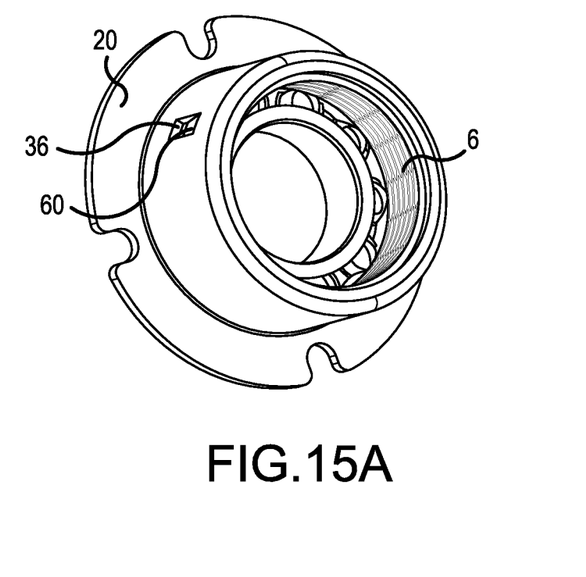
FIG. 15a is perspective view of the bearing unit and connecting element of FIG. 15 removed from the bearing carrier.
Figure 16:
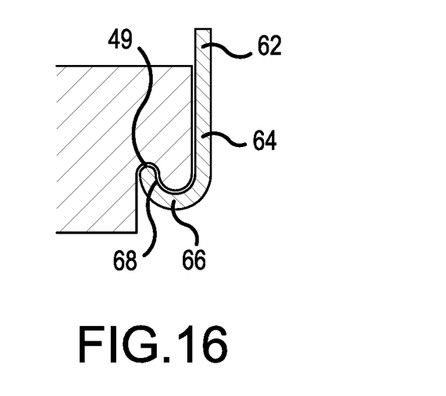
FIG. 16 is a detail view of a connection between the connecting element and the bearing carrier of FIG. 15.
Figure 16A:
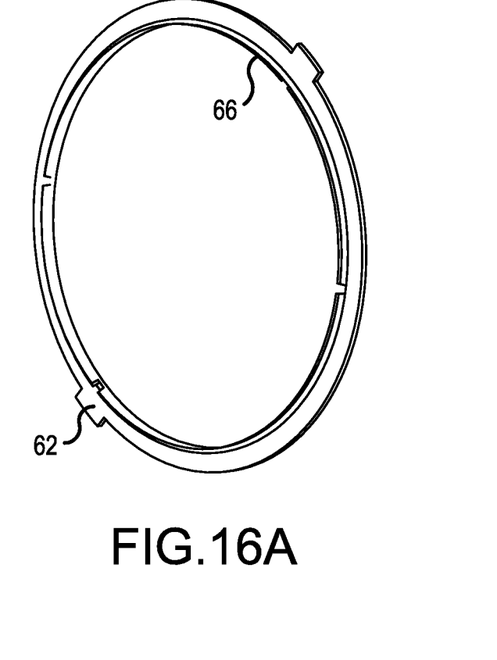
FIG. 16a is a perspective view of the connecting element of FIG. 15.

FIGS. 15 and 16 show a similar construction as the FIGS. 11 to 14. Here, however, the connecting element 60 is includes a flange 66 that in turn includes an undercut 68 that in turn engages into the groove 49. This undercut thus ensures an interference fit in the axial direction so that the connecting element 60 itself limits the axial movability of the bearing ring 40 relative to the bearing carrier. Furthermore, a wall 36 of the opening 30 serves as an axial stop so that the bearing assembly 1 is also configured here as a preassembled bearing unit. In this exemplary embodiment, the connecting element 60 is preferably manufactured from a non-metallic material.

Figure 7:
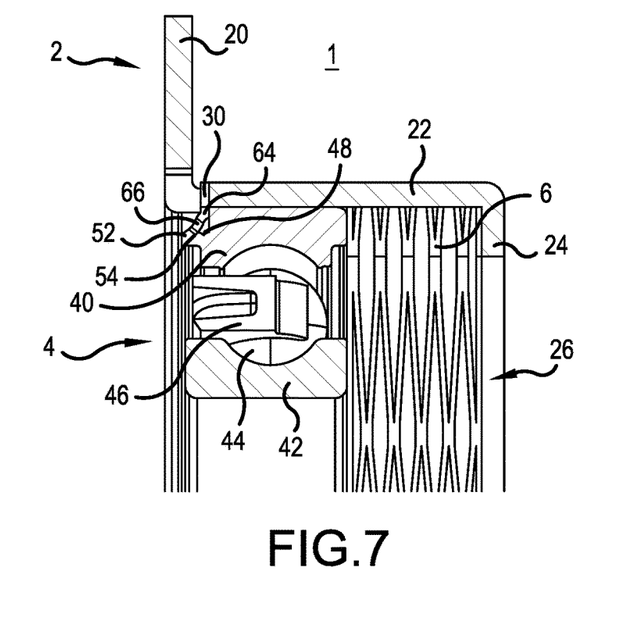
FIG. 7 is a sectional side elevational view of a non-locating bearing assembly including a bearing unit, a bearing carrier and a connecting element according to a second embodiment of the present disclosure.

In addition to the arrangement of the opening 30 in the pot wall 22 of the bearing carrier 22, the opening 30 can of course also, in a manner analogous to the exemplary embodiment depicted in FIG. 7, be formed in the region of the transition between the flange 20 and the pot wall 22. FIGS. 17 to 20 show a corresponding exemplary embodiment. The connecting element 60 also protrudes here by its projections 62 again into the opening 30 and is held by it in the circumferential direction such that the connecting element 60 and the opening 30 are rotationally fixed. In contrast, the connecting element 60 is movable in the opening 30 in the axial direction. Similarly as in FIG. 7, the projection 62 can again extend over the radial height of the opening 30 behind the flange 20 in order to limit axial movement; however, it is also possible to provide additional stakings 32 on the flange 20, which form a stop for the bearing ring 40 or the connecting element 60 (for this purpose see FIG. 19).

Figure 17:
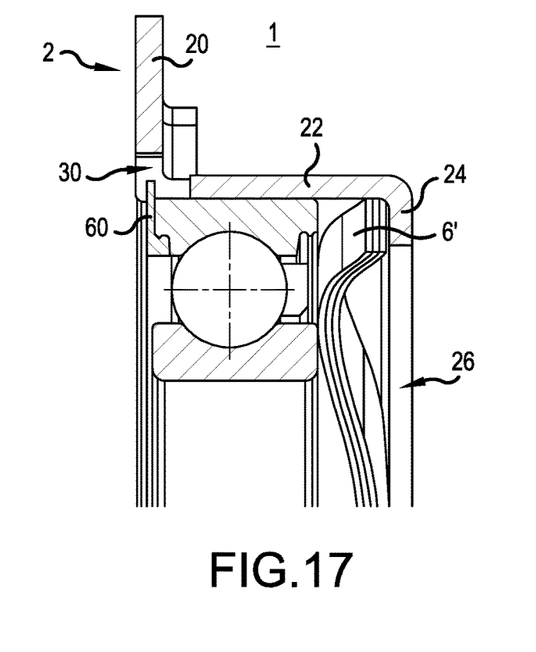
FIG. 17 is a sectional side elevational view of a non-locating bearing assembly including a bearing unit, a bearing carrier and a connecting element according to a fifth embodiment of the present disclosure.
Figure 18:
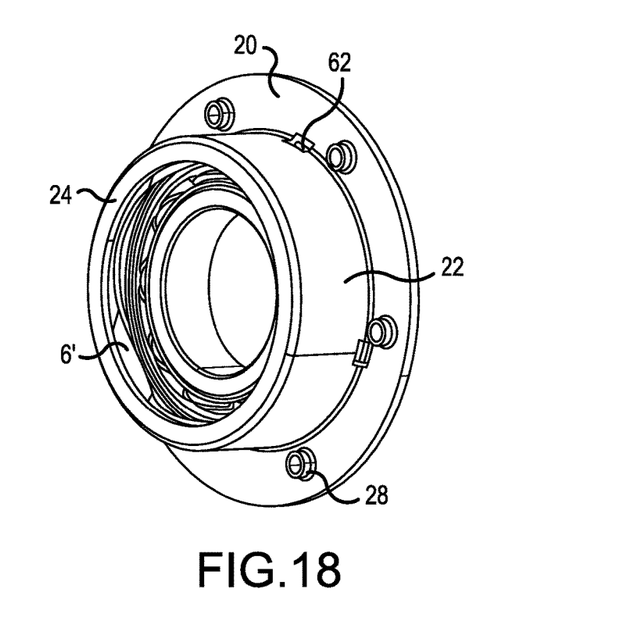
FIG. 18 is a perspective view of the bearing carrier of FIG. 17.
Figure 19:
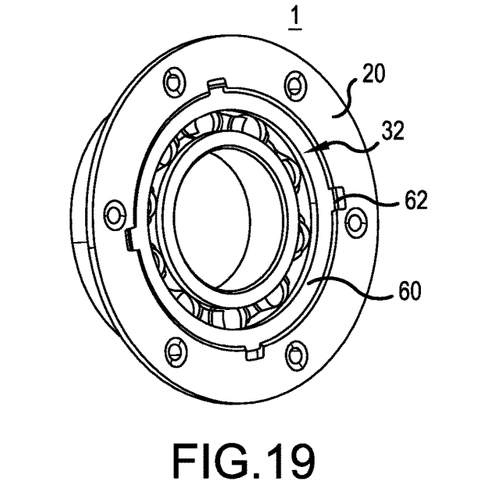
FIG. 19 is a perspective view of the bearing unit and connecting element of FIG. 17 removed from the bearing carrier.
Figure 20:
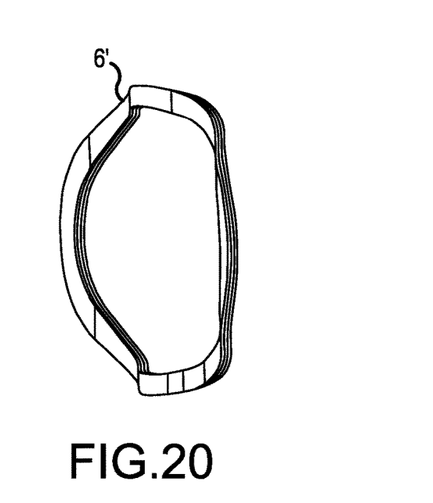
FIG. 20 is a perspective view of the connecting element of FIG. 17.

FIG. 17 furthermore shows that instead of the counteracting wave spring shown in the preceding exemplary embodiments, which is used as spring element 6, a counteracting, multiple-layer wave spring 6' shown in FIG. 20 is also usable. Of course, all other spring elements such as, for example, plate springs or screw springs are also usable.

Figure 21:
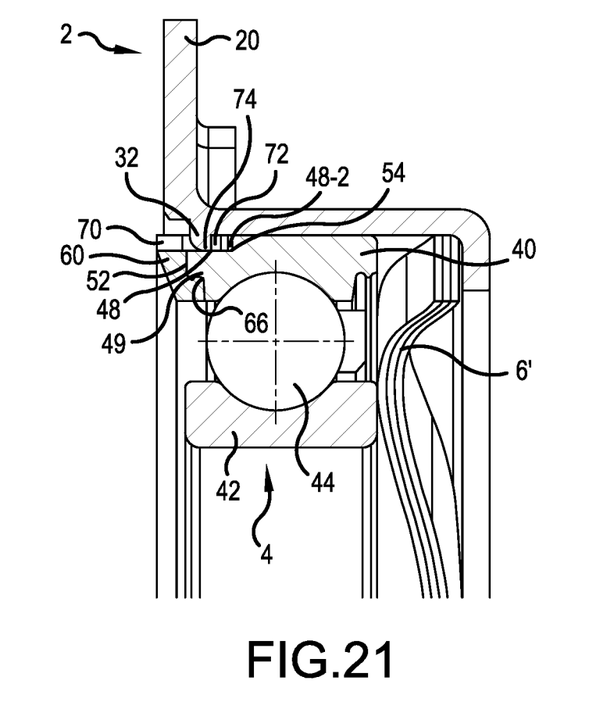
FIG. 21 is a sectional elevational view of a sixth exemplary embodiment of a non-locating bearing assembly according to the present disclosure.
Figure 22:
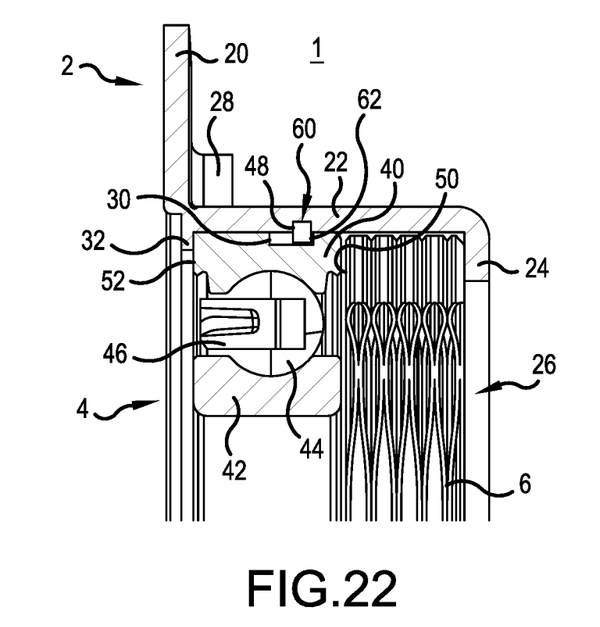
FIG. 22 is a sectional elevational view of a seventh exemplary embodiment of a non-locating bearing assembly according to the present disclosure.

FIG. 21 shows a further preferred exemplary embodiment in which a connecting element 60 is in turn snapped into the seal groove 49 of the bearing ring 40. However, in addition to the seal groove 49, the bearing ring 40 includes a second groove 48 that extends from an end surface 52 on the axial outer side of the bearing ring 40 to a step 54 that then forms the groove wall 48-2. A connecting element 60 is furthermore received in the groove 48, which connecting element 60 also includes an axially extending annular element 70, wherein the connecting element 60 completely surrounds the bearing ring 40 on its an axial end side 52. Here the groove 48 can be configured as a circumferential groove, but it is also possible to form pockets only in sections, into which the axially extending ring elements 70 of the connecting element 60 with projections 72 extend. The axially extending ring element 70 can furthermore be equipped with openings 74, into which stakings 32 that are formed on the bearing carrier 2 can engage in order to provide a rotation-securing.

Since the connecting element 60 completely surrounds the end side 52 of the bearing ring 40, the friction fit of the bearing ring 40 is maximized so that the connecting element 60 is attached to the bearing ring 40 such that they are rotationally fixed even with high rotational load.

The axial movability of the bearing 4 with respect to the bearing carrier 2 can be achieved in the exemplary embodiment depicted here via the size of the opening 74. Here the opening 74 can in turn provide a stop both for both axial directions. However, it is also possible to use only the step 54 of the groove 48 as an axial limitation that interacts with the staking 32 in order to limit the axial movability of the bearing 4 and to provide the bearing 4 and the bearing carrier 2 as a preassembled unit.

It is to be noted overall that all exemplary embodiments and the features shown therein can also be present combined with one another differently. Thus a plate spring can always be used instead of the wave spring. The arrangement of bearing unit 4 and spring element 6 is also arbitrarily selectable. It is furthermore possible to provide a corresponding spring element 6 on both the one side and on the other side of the bearing 4. Instead of the staking forming the stop 32, other possibilities for providing a stop 32 or an axial movement limitation of the bearing ring are also comprised by the scope of protection.

Overall, using the proposed non-locating bearing assembly 1 a simple-to-handle unit can be provided that can be directly installed in its entirety without having to take account of tolerances of the housing, shaft, bearing, snap ring, elastomer ring, and spring. The usability of an entirely preassembled unit also reduces the installation time and thus installation costs. Since bearing carrier 2 and bearing unit 4 are manufactured from the same material, or from materials that thermally expand in a similar manner, a drastic reduction of the negative influence of different temperature-dependent expansions of bearing and light metal of a housing can be achieved.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved non-locating bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Non-locating bearing assembly
2 Bearing carrier
20 Flange
22 Pot wall
24 Pot base
26 Recess
28 Attachment element
30 Opening
32 Stop; staking
36 Wall of the opening
4 Bearing unit
40 Bearing outer ring
42 Bearing inner ring
44 Rolling element 46 Cage
48 Rotation-securing element-groove
49 Seal groove
50; 52 End surfaces of the bearing ring
54 Step
60 Connecting element
62 Rotation-securing element-projection
64 Ring element
66 Rotation-securing element-tabs
68 Undercut
70 Second annular element of the connecting element
72 Second projections of the connecting element
74 Opening in the annular element
6, 6' Spring element

What is claimed is:

1. A non-locating bearing assembly comprising:
a bearing unit configured to support a rotatable component relative to a stationary component, the bearing unit including a first stationary bearing ring and a second rotatable bearing ring, the rotatable bearing ring being fixedly connectable to the rotatable component and the stationary ring having a circumferential groove formed in an outer surface of the stationary ring, and
a bearing carrier having an axially-extending groove and being attached to the stationary bearing ring by a connecting element including a ring portion disposed within and frictionally engaged with the circumferential groove of the stationary ring and a projection extending radially from the ring portion and disposed within the groove of the bearing carrier so as to allow axial displacement of the stationary ring while at least resisting rotation of the stationary ring,
wherein the bearing carrier includes a flange configured to be fixedly connected to the stationary component.

2. The non-locating bearing assembly according to claim 1,
wherein the non-locating bearing assembly is provided as a preinstallable unit.

3. The non-locating bearing assembly according to claim 1,
including a spring in the bearing carrier configured to axially preload the bearing ring toward an end of the bearing carrier.

4. The non-locating bearing assembly according to claim 3, including a stop element on the bearing carrier, the stop element being configured to interact with the spring element or the bearing ring to limit an axial movement of the spring element or the bearing ring.

5. The non-locating bearing assembly according to claim 1,
wherein the connecting element is resilient in a radial direction and configured to apply a radially inward force against a bottom of the groove, and
wherein the projection is formed by at least one radially outwardly directed end of the connecting element.

6. The non-locating bearing assembly according to claim 5,
wherein the connecting element is a snap ring.

7. The non-locating bearing assembly according to claim 1,
wherein the connecting element includes radially resilient tabs configured to snap or spread into the groove to form the friction fit.

8. The non-locating bearing assembly according to claim 1,
wherein the circumferential groove is formed at a transition from a radial surface of the stationary bearing ring to an end surface of the stationary bearing ring and is open in an axial direction.

9. A non-locating bearing assembly comprising:
a bearing unit configured to support a rotating component relative to a stationary component, the bearing unit including a first stationary bearing ring and a second rotatable bearing ring, the rotatable bearing ring being fixedly connectable to the rotating component and the stationary bearing ring having a circumferential groove formed in an inner surface of the stationary ring, and
a bearing carrier having an axially-extending opening and to which the stationary bearing ring is attached by a connecting element including an annular body disposed adjacent to an axial end of the stationary bearing ring and having at least one tab or at least one flange frictionally engaged with the circumferential groove in the inner surface of the stationary ring and at least one projection protruding into the axial opening in the bearing carrier so as to allow axial movement of the stationary ring while at least resisting rotation of the stationary ring,
wherein the bearing carrier includes a flange configured to be fixedly connected to the stationary component.

10. A non-locating bearing assembly comprising:
a bearing unit configured to support a rotatable component relative to a stationary component, the bearing unit including a first stationary bearing ring and a second rotatable bearing ring, the rotatable bearing ring being fixedly connectable to the rotatable component and the stationary ring having one of:
a circumferential groove, the circumferential groove being formed in an outer surface of the stationary ring or formed in an inner surface of the stationary ring, and
an axially-extending groove formed in the outer surface of the stationary ring;
a bearing carrier having a cylindrical body providing a cavity for receiving the bearing unit and a flange configured to connect to the stationary component, and one of:
an axially-extending recess formed in the cylindrical body when the stationary ring includes the circumferential groove, and
a circumferential groove formed in an inner surface of the cylindrical body when the stationary ring includes the axial extending groove, and
a connecting element for attaching the stationary bearing ring to the bearing carrier and including one of:
an annular body disposed within and frictionally engaged with the circumferential groove in the outer surface of the stationary ring and having at least one projection protruding into the axially-extending recess in the cylindrical body of the bearing carrier;
an annular body disposed adjacent to an axial end of the stationary ring, having at least one tab or at least one flange frictionally engaged with the circumferential groove in the inner surface of the stationary ring and at least one projection protruding into the axially-extending recess in the cylindrical body of the bearing carrier; and
an annular body disposed within and frictionally engaged with the circumferential groove in the inner surface of the cylindrical body of the bearing carrier and having at least one projection protruding radially inwardly into the axially-extending recess in the stationary bearing ring.

11. The non-locating bearing assembly according to claim 10,
wherein the connecting element having the annular body in the circumferential groove in the inner surface of the cylindrical body of the carrier is resilient in a radial direction and configured to apply a radially outward force against a bottom of the circumferential groove, and
wherein the projection is formed by at least one radially inwardly directed end of the connecting element.

12. The non-locating bearing assembly according to claim 11,
wherein the connecting element is a snap ring.

13. The non-locating bearing assembly according to claim 12,
wherein the connecting element includes radially resilient tabs configured to snap or spread into the groove to form the friction fit.

\* \* \* \* \*